(12) United States Patent
Wu et al.

(10) Patent No.: US 8,223,836 B2
(45) Date of Patent: Jul. 17, 2012

(54) CONSTANT-QUALITY RATE CONTROL SYSTEM AND ALGORITHM FOR REGIONS OF INTEREST

(75) Inventors: Ping-Hao Wu, Taipei (TW); Homer H. Chen, Taipei (TW)

(73) Assignee: National Taiwan University, Taipei (TW)

( * ) Notice: Subject to any disclaimer, the term of this patent is extended or adjusted under 35 U.S.C. 154(b) by 1369 days.

(21) Appl. No.: 11/889,874

(22) Filed: Aug. 17, 2007

(65) Prior Publication Data

US 2008/0225945 A1  Sep. 18, 2008

(30) Foreign Application Priority Data

Mar. 13, 2007  (TW) ............................... 96108552 A (51) Int. Cl.
*H04N 7/12* (2006.01)
(52) U.S. Cl. .......... 375/240.09; 375/240.26; 375/240.08
(58) Field of Classification Search ............... 375/240.09
See application file for complete search history.

(56) References Cited

U.S. PATENT DOCUMENTS

| 543,047 A | 7/1995 | Takahama et al. |
| 6,122,318 A * | 9/2000 | Yamaguchi et al. .......... 375/240 |
| 634,291 A1 | 1/2002 | Inou et al. |
| 673,490 A1 | 5/2004 | Kudo et al. |
| 678,162 A1 | 8/2004 | Thomas |
| 6,853,466 B1 * | 2/2005 | Harada et al. ................. 382/173 |
| 6,980,143 B2 * | 12/2005 | Linzmeier et al. ............ 341/143 |

OTHER PUBLICATIONS

Daniele Bagni, Bruno Biffi, and Rui Ramalho, "A Constant-Quality, Single-Pass VBR Control for DVD Recorders", IEEE Transactions on Consumer Electronics, vol. 49, No. 3, p. 653-662, Aug. 2003.
P.H. Westerink, R. Rajagopalan, C.A. Gonzales, "Two-Pass MPEG-2 Variable-Vit-Rate Encoding", p. 471-488 IBM J. Res. Develop. vol. 43, No. 4, Jul. 1999.
Zhengguo Li, Wen Gao, Feng Pan, Siwei Ma, Keng Pang Lim, Genan Feng, Xiao Lin, Susanto, Rahardja, Hanqin Lu and Yan Lu, "Adaptive Rate Control with HRD Consideration", Joint Video Team (JVC) of ISO/IEC MPEG & ITU-T VCEG (ISO/IEC JTC1/SC29/WG11 and ITU-T SG16 Q.6) 8th Meeting, Geneva, May 20-26, 2003.

* cited by examiner

*Primary Examiner* — David Y Jung
(74) *Attorney, Agent, or Firm* — Rosenberg, Klein & Lee (57) ABSTRACT

A constant-quality rate control system and algorithm for multiple encoders with a single video source are disclosed. The system comprises a base encoder, a region of interest (ROI) detector, and at least one ROI encoder. The base encoder encodes a base video sequence which is a down-sampled version of a video sequence and sends the base video sequence to a multiplexer. The ROI detector extracts an ROI video sequence from the original video sequence. The ROI encoder encodes the ROI video sequence and sends it to the multiplexer. The ROI encoder uses information obtained during encoding of the base video sequence to improve the encoding of the ROI video sequence. The information of the base video sequence are used to better control the bit-rate and the quality of the ROI video sequence.

20 Claims, 6 Drawing Sheets

CONSTANT-QUALITY RATE CONTROL SYSTEM AND ALGORITHM FOR REGIONS OF INTEREST

BACKGROUND OF THE INVENTION

1. Field of the Invention

The present invention relates to a constant-quality rate control technique and, more particularly, to a constant-quality rate control system and algorithm for regions of interest in a single video source.

2. Description of Related Art

Bit rate control plays a very important role in video quality. Control mechanisms are used to determine the data rate of compressed video so that video streams can be successfully delivered and the best video quality can be achieved.

According to the bit-rate characteristics of the compressed video, rate control can be either constant bit-rate (CBR) or variable bit-rate (VBR). CBR is widely used in digital A/V applications that are constrained by constant channel bandwidth such as digital television or video conferencing. However, because video signals are non-stationary in nature, it is almost impossible to achieve constant video quality with CBR encoding. Alternatively, VBR is often used since it can provide constant video quality.

There are many constant-quality rate control algorithms that have been developed. Adaptive algorithms vary the quantization step size according to characteristics or properties of a video sequence. These algorithms however cannot guarantee meeting storage size constraints. Two-pass algorithms generate constant-quality video during the second pass of the encoding process according to information obtained in the first pass.

However, while these algorithms can perform effectively in certain applications, they cannot be used in real-time applications due to the computational complexity and two-pass nature of the two-pass algorithm.

To solve the above problems, several single-pass constant-quality rate control algorithms have been developed in which the quantization parameter for a frame is selected according to the statistics gathered from characteristics of previously encoded frames.

Therefore, there is need for a constant-quality rate control algorithm which provides optimal overall quality of a video signal while meeting the bit-rate constraint.

SUMMARY OF THE INVENTION

An object of the present invention is to provide a system for constant-quality rate control of regions of interest that uses multiple encoders with a single video source. The present invention comprises a base encoder that encodes a downsampled full-sized version of an input video sequence and a region of interest (ROI) encoder that encodes a region of interest sequence of the input video at the original resolution. Utilizing the relationship between the two independent encoders, the algorithm of the present invention allocates the bits for the ROI encoding according to information, for example the distortion, obtained during encoding of the corresponding region in the base sequence. The algorithm of the present invention achieves significant reduction in image quality variation.

Another object of the present invention is to provide a constant-quality rate control algorithm for multiple encoders with a single video source, in which the quantization step size is used to calculate the image complexity.

The present invention also provides a constant-quality rate control algorithm comprising: initial quantization parameter (QP) determination, mean absolute difference (MAD) prediction, remaining bits estimation, target bit allocation, and QP determination.

The present invention provides a constant-quality rate control system using multiple encoders with a single video source, which comprises a base encoder, a region of interest (ROI) detector, and at least one ROI encoder. The base encoder is used to encode a base sequence which is a downsampled version of the video sequence and send the encoded base sequence to a multiplexer. The ROI detector is used to extract an ROI video sequence. The ROI encoder is used to encode the ROI video sequence according to information provided by the base encoder, and output the encoded ROI sequence to the multiplexer.

Because the ROI sequence and its corresponding region in the base sequence have similar content but at different resolutions, information obtained through the encoding of the base sequence is used to improve the encoding of the ROI sequence. In the present invention, statistics of the base sequence are used to better control the bit-rate and the quality of the ROI sequence.

Regions of interest are often needed to be shown in more detail. By employing a constant-quality encoding algorithm, each frame of the ROI sequence can be encoded at the same quality level, avoiding unnecessarily high peak signal-to-noise ration (PSNR) of the low-activity frames and saving more bits for the high-activity frames.

Statistics of the base encoder collected during the encoding of the base sequence are used to estimate how many bits are needed for a frame in the ROI sequence to achieve constant quality.

The present invention also provides a constant-quality rate control algorithm for multiple encoders with a single video source, which comprises the steps of: determining an initial quantization parameter; predicting the mean absolute difference (MAD) of a current frame in the ROI sequence from the corresponding region in the base sequence; estimating the number of remaining bits of the current frame according to complexity of the frame; calculating the number of bits to allocate to the current frame in order to make the quality of the current frame similar to that of an immediately previous frame; and determining an I frame quantization parameter and a P frame quantization parameter in order to make the bit rate of the video constant and enhance the frame quality.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENTS

The present invention provides a constant-quality rate control system and algorithm for multiple encoders with a single video source. Statistics from a full-sized view base sequence are used to improve the quality of the ROI sequence. In the present invention the encoding complexity is reduced, and a faster encoding algorithm is provided to achieve a smoother and better signal-to-noise ratio (SNR).

Figure 1:
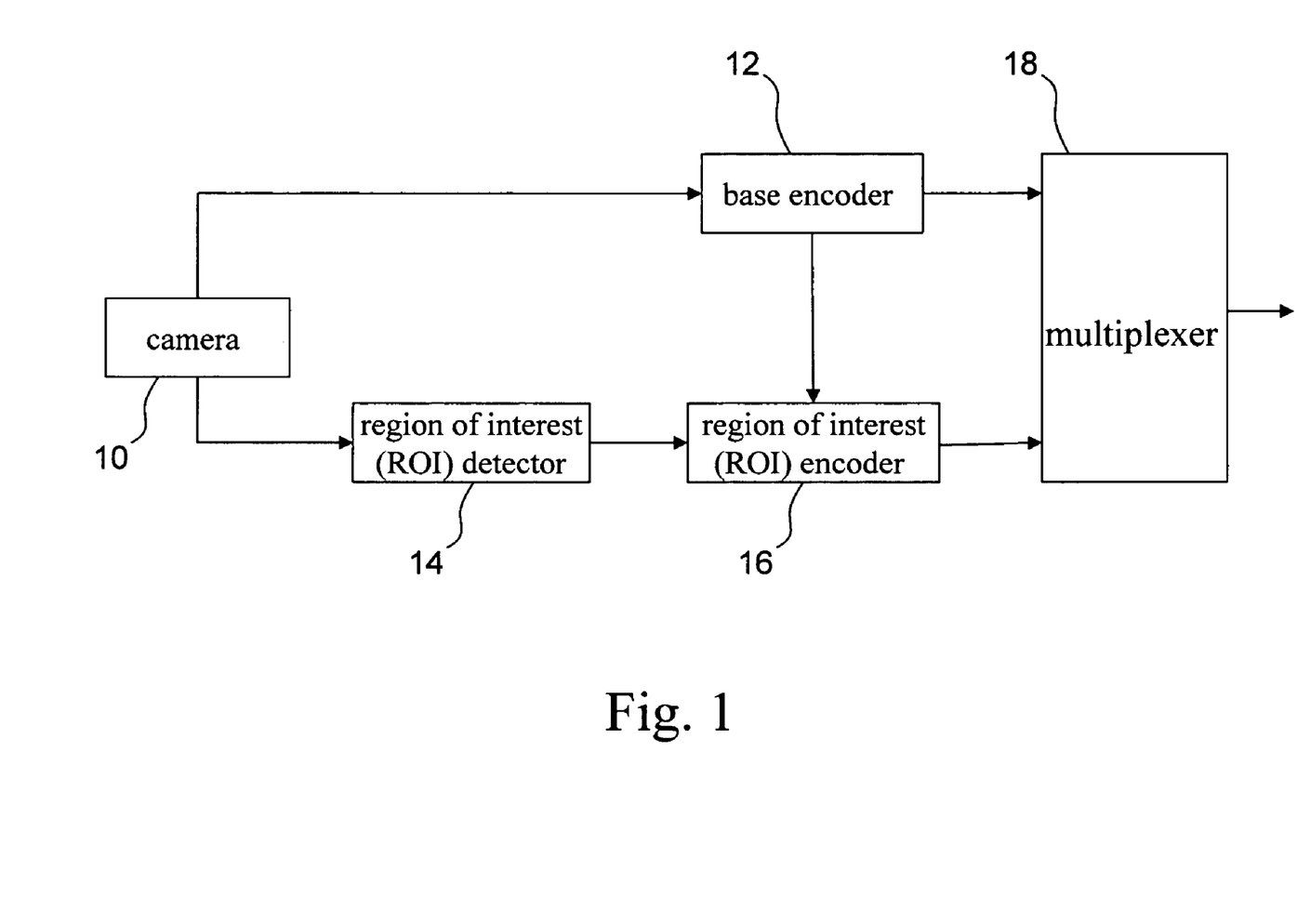
FIG. 1 is a block diagram of a constant-quality rate control system using multiple encoders with a single video source according to an embodiment of the present invention.

As shown in FIG. 1, the constant-quality rate control system for multiple encoders with a single video source of the present invention utilizes a video source, for example a high-resolution camera 10, a base encoder 12, an ROI detector 14, at least one ROI encoder 16 and a multiplexer 18. In this embodiment the video source comprises a video sequence captured by a camera. In other embodiments of the present invention the video source is a streaming video sequence, a stored video sequence, a real-time video sequence, or a single frame.

The camera 10 captures a full-sized view video sequence and each frame of the video sequence is down-sampled horizontally and vertically by a factor of two prior to being sent to the base encoder 12. The base encoder 12 encodes the down-sampled video sequence into a base sequence. Next, the base sequence is sent to the multiplexer 18. Statistics obtained during the encoding process of the base sequence are sent to the ROI encoder 16. The camera 10 also sends the video sequence to the ROI detector 14, which extracts an ROI sequence from the video sequence. The ROI sequence is then sent to the ROI encoder 16 which encodes the ROI sequence at the original resolution. The output bit rate and the image quality of the ROI sequence are controlled based on the statistics provided by the base encoder 12. The ROI sequence is then sent to the multiplexer 18.

The ROI sequence and its corresponding region in the base sequence have similar content but at different resolutions. As mentioned, the ROI sequence is extracted from the video sequence by the ROI detector 14 and then encoded by the ROI encoder 16. After the encoding of a current frame is finished, the encoding process for the next frame is performed. Through the correlation between the base sequence and the ROI sequence, information obtained when encoding the base sequence is used to enhance the encoding of the ROI sequence.

Figure 2:
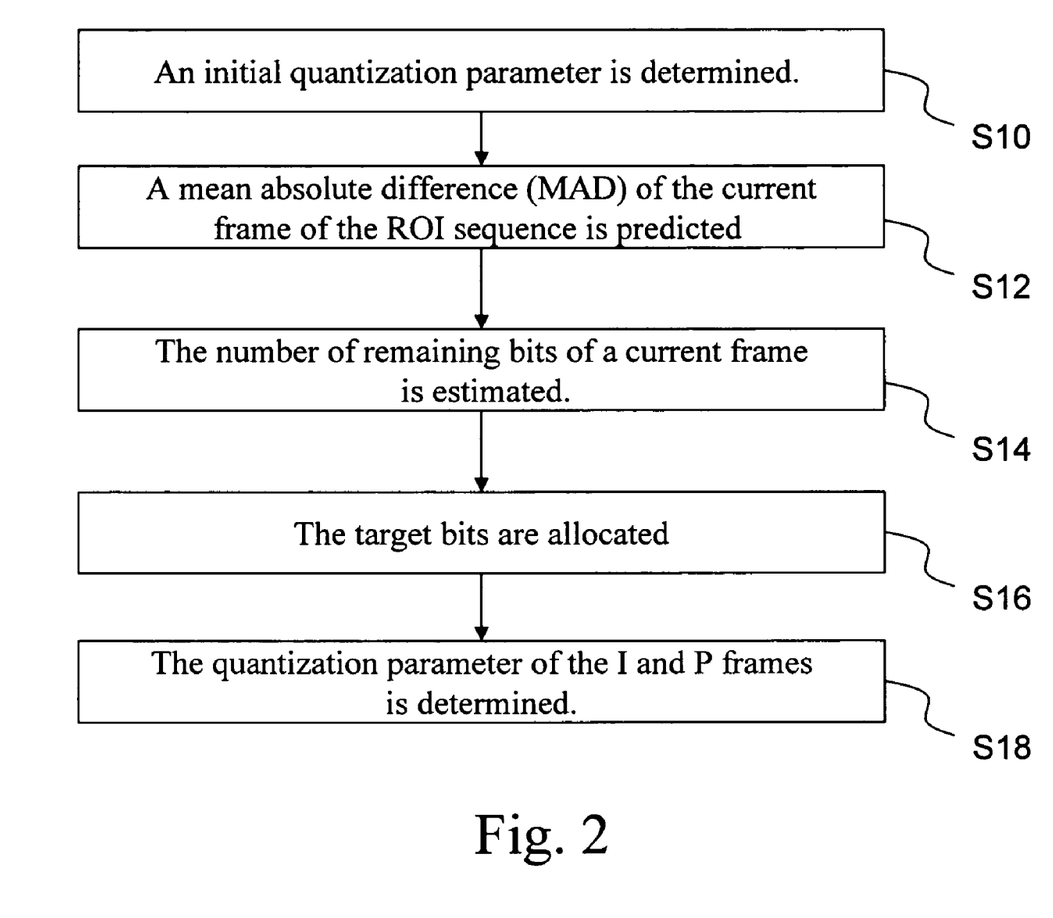
FIG. 2 is a flowchart of a constant-quality rate control system using multiple encoders with a single video source according to an embodiment of the present invention.

As shown in FIG. 2, the constant-quality rate control algorithm for multiple encoders with a single video source of the present invention comprises the following steps:

Step S10:

An initial quantization parameter is determined and an ROI sequence is extracted from the video sequence according to this initial quantization parameter. In an embodiment of the present invention, the initial quantization parameter $QP_0$ is obtained using the following equation:

$$QP_0 = a \times bpp^b \tag{1}$$

where bpp is the average bits per pixel in a frame and a and b are parameters relating to the size of the frame, for example, 14 and −0.32 respectively for a CIF size sequence.

Figure 3A:
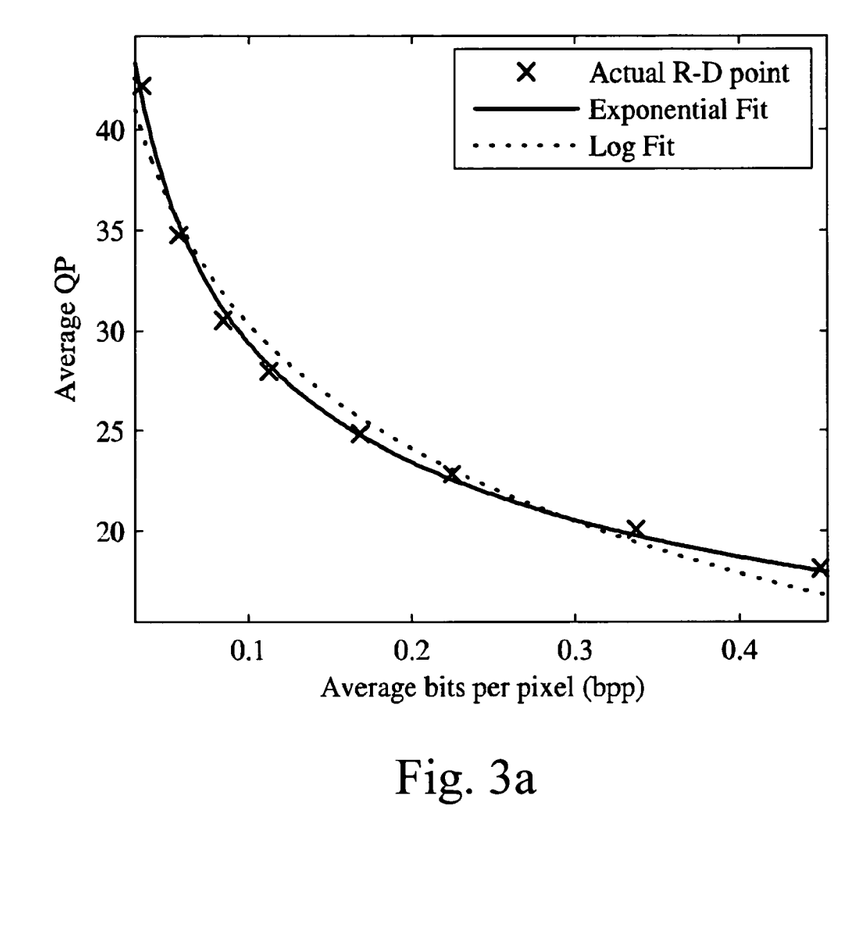
FIGS. 3a and 3b are graphs of average quantization parameter versus average bit number of each frame according to an embodiment of the present invention.
Figure 3B:
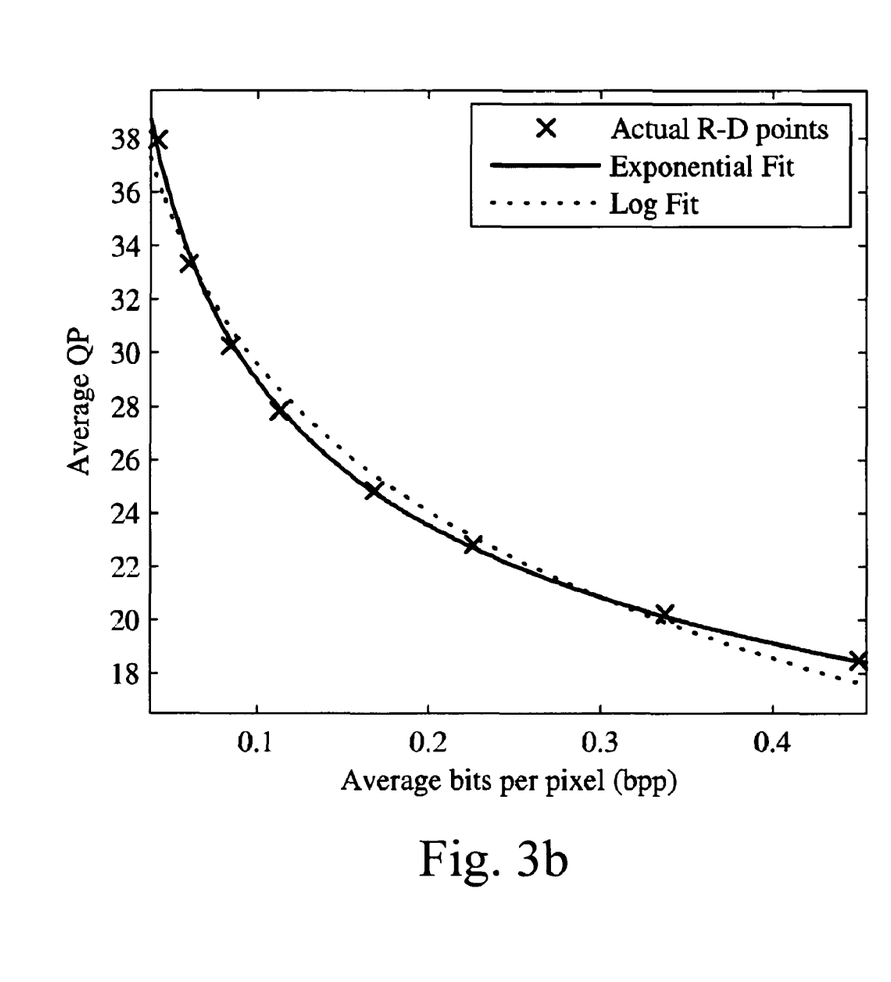

Refer to FIGS. 3a and 3b, which are graphs of average quantization parameter versus average bits per pixel curves of twelve CIF sequences encoded at eight different bit-rates to test Equation (1). In FIG. 3a, the sequence contains no B frame; while in FIG. 3b, there are two B frames between two I or P frames in the sequence. As shown in FIGS. 3a and 3b, the initial quantization parameter obtained using Equation (1) is not restricted and an appropriate initial quantization parameter can be selected according to the encoding setting.

Step S12:

In Step S12 a mean absolute difference (MAD) of a current frame in the ROI sequence is predicted according to the corresponding region in the base sequence.

H.264 adopts rate-distortion optimization (RDO) to optimally select the mode and motion vectors. RDO needs the quantization parameter in order to calculate the Lagrange multiplier λ and the number of bits required to encode the frame. Different quantization parameters may result in different motion vectors and modes. Therefore, it is necessary to determine the quantization parameter first by rate control. However, the MAD between the original and the motion-compensated block, which is needed to calculate the quantization parameter before RDO, is only available after performing the RDO. This will cause an unsolvable loop.

In the rate control of H.264, linear prediction of the MAD of the current frame is performed using the MAD of the previous frame. The present invention provides a new method in the MAD calculating step, by predicting the MAD of the current frame in the ROI sequence from the corresponding region in the base sequence. The MAD prediction by linear regression becomes:

$$MAD_{curr,ROI} = a_1 \times MAD_{curr,base} + a_2 \tag{2}$$

wherein $MAD_{curr,ROI}$ represents the MAD of the current frame in the ROI sequence, $MAD_{curr,base}$ represents the MAD of the corresponding region in the base sequence; and $a_1$ and $a_2$ are parameters that are adjusted according to information obtained in previous encoding processes.

Figure 4:
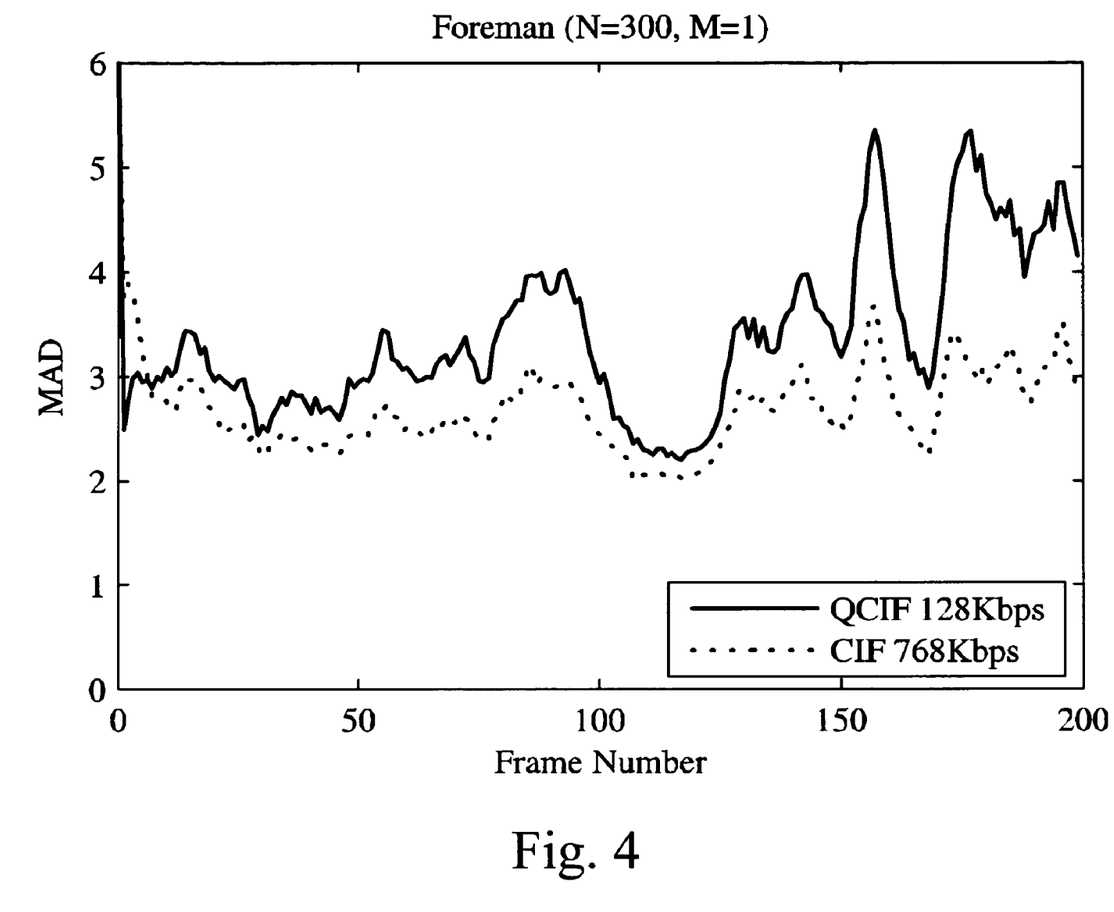
FIG. 4 is a graph of mean absolute difference (MAD) versus frames per second (fps) of a CIF size and QCIF size Forman sequence (N=300, M=1) encoded at 768 Kbps (CIF) and 128 Kbps (QCIF) using JM8.4.

FIG. 4 is a graph of mean absolute difference (MAD) versus frames per second (fps) of a CIF size and QCIF size Forman sequence (N=300, M=1) encoded at 768 Kbps (CIF) and 128 Kbps (QCIF) using JM8.4. In both sequences, only the first frame is set as the intra frame. As shown in FIG. 4, the MAD curves of the two sequences, which contain similar content at different resolutions, are very similar.

Step S14:

Remaining bits are allocated to each picture type according to the corresponding complexity measure.

In the present invention the complexity measure calculated by:

$$X^t = b^t \times Q^t, \; t \in I, P, B.$$

where X is the complexity, b is the actual number of bits, Q is the quantization parameter, and t is the frame type.

In the present invention, the quantization parameter frequently used in the conventional algorithms is replaced by the quantization step size for Q in order to determine the complexity of the frame since the quantization step size is the true value used to quantize the discrete cosine transform (DCT) coefficients while the quantization parameter indirectly indicates the step size.

In the present invention, the remaining bits are allocated according to the formula:

$$T_{rem}^t = \frac{T_{total} \times X_{avg}^t N_{rem}^t}{X_{avg}^I N_{rem}^I + X_{avg}^P N_{rem}^P + X_{avg}^B N_{rem}^B}, \; t \in I, P, B, \tag{3}$$

where $T^t_{rem}$ is the number of remaining bits for frame type t, $T_{total}$ is the total number of remaining bits, $X^t_{avg}$ is the average complexity for frame type t, $N^t_{rem}$ is the number of remaining frames of type t.

Update of the average complexity $X^t_{avg}$ is carried out by using the average number of bits $b^t_{avg}$ and the average quantization step size of the previously encoded frames of type t $Q^t_{step,avg}$. The formula is as follows:

$$X^t_{avg} = b^t_{avg} \times Q^t_{step,avg} \quad (4)$$
$$= \left( \frac{1}{W^t_X} \sum_{i=N^t_c-W^t_X+1}^{N^t_c} b^t(i) \right) \times \left( \frac{1}{W^t_X} \sum_{i=N^t_c-W^t_X+1}^{N^t_c} Q^t_{step}(i) \right),$$

where $b^t(i)$ and $Q^t_{step}(i)$ are the actual number of bits and the average quantization step size of the i-th type t frame, respectively. $N^t_c$ represents the number of coded frames of type t. The calculation formula of the window length $W^t_x$ is as follows:

$$W^t_x = \min\{N^t_c, \theta_x\} \quad (5)$$

where $\theta_x$ is the upper bound of the window length.

Step S16:

Since the content is the same but at different resolutions, the ROI sequence and its corresponding region in the base sequence have similar picture quality trends. The present invention uses the distortion obtained from the base sequence to allocate bits for the ROI sequence.

First, in order to allocate bits for the current frame so that constant quality can be achieved, it is necessary to define the frame complexity according to the distortion of the corresponding region in the base sequence. If $D^t_{base}(i)$ is the distortion of the i-th type-t frame obtained from the corresponding region of the base sequence, the frame complexity $S^t_{base}$ is defined as:

$$S^t_{base} = \frac{\ln(D^t_{base}(N^t_c+1))}{\ln(\overline{D}^t_{base})} \quad (6)$$

and $$\overline{D}^t_{base} = \frac{1}{W^t_D} \sum_{i=N^t_c-W^t_D+2}^{N^t_c+1} D^t_{base}(i) \quad (7)$$

where $D^t_{base}(N^t_c+1)$ is the distortion of the current frame, $\overline{D}^t_{base}$ is the average distortion of the previous frames obtained from the corresponding region in the base sequence, and $W^t_D$ is the window length calculated by Equation (5). The distortion is calculated using the MAD between the original and the reconstructed pixels. After the frame complexity measure has been obtained in Equation (6), the number of bits allocated to the current frame can be computed according to the average bits actually produced. If the remaining number of bits is not taken into consideration, the target bit-rate constraint may not be satisfied. To handle the target bit-rate constraint, the target number of bits $T^t$ can be computed by the following equation:

$$T^t = S^t_{base} \times (\text{average number of remaining bits}) \quad (8)$$
$$= S^t_{base} \times \left( \frac{T^t_{rem}}{N^t_{rem}} \right)$$

where T represents the target number of bits.

Because the rates of the remaining bits and the used bits should be close to the target bit rate, the average used bits can be replaced by the average remaining bits to better constrain the target bit rate.

Because the resolutions of the base sequence and the ROI sequence are different, they are encoded at different quality levels. However, Equation (8) does not take the speed of quality change into consideration. One of the sequences may change faster in terms of PSNR than the other one does. Therefore, the distortion variation of more than one previous frame in the ROI sequence is monitored.

Linear prediction of the distortion $\tilde{D}_{ROI}(i)$ of the current frame in the ROI sequence can be performed using the following equation:

$$\tilde{D}_{ROI}(i) = c_1 \times D_{ROI}(i-1) + c_2, \quad (9)$$

where $D_{ROI}(i-1)$ is the distortion of frame (i-1), and $c_1$ and $c_2$ are parameters updated by linear regression after the current frame is coded. Next, the adjustment factor $S^t_{ROI}$ for the target bits is calculated as follows:

$$S^t_{ROI} = \frac{\ln(\overline{D}^t_{ROI}(N^t_c+1))}{\ln(\overline{D}^t_{ROI})}, \quad (10)$$

and $$\overline{D}^t_{ROI} = \frac{1}{W^t_D} \sum_{i=N^t_c-W^t_D+1}^{N^t_c} D^t_{base}(i) \quad (11)$$

where $\tilde{D}_{ROI}(i)$ is the average distortion of $W^t_D$ previous frames. If the predicted distortion of the current frame is larger than the average distortion of previously encoded frames, more bits are allocated to the current frame, and vice versa.

The combined frame complexity measure for the current frame is then calculated by:

$$S^t_{current} = S^t_{base} \times S^t_{ROI} \quad (12)$$

In order to prevent overflow or underflow, $S^t_{current}$ is limited as follows:

$$S^t_{current} = \min\{\theta_1, \max\{\theta_2, S^t_{current}\}\} \quad (13)$$

where $\theta_1$ and $\theta_2$ are the upper limit and the lower limit of the complexity, respectively. Finally, $S^t_{base}$ in equation (8) is replaced with $S^t_{current}$ to calculate the target bit allocation of the current frame:

$$T^t = S^t_{current} \times \left( \frac{T^t_{rem}}{N^t_{rem}} \right) \quad (14)$$

Step S18:

Next, an I frame quantization parameter and a P frame quantization parameter of the current frame are determined.

First, the quantization parameter for an I frame is calculated. Generally, the I frame quantization parameters are determined by the average of quantization parameters for all P frames in the previous group of picture (GOP) and the quantization parameter of the previous I frame. Because the scene may have changed after one GOP, it is unnecessary to put restrictions on the difference of quantization parameters between the two I frames of successive GOPs. Furthermore, the I frame quantization parameter is usually set too small. Although an I frame with better quality can reduce the bits needed for encoding the following frames at the same quality, if the I frame quantization parameter is set too small, the bit budget may be overused, causing quality degradation for the following inter frames.

The step of calculating the I frame quantization parameter of the present invention is as follows:

$$Q_{step,i}(1) = \frac{SumPQ_{step}(i-1)}{N_P(i-1)}, \quad (15)$$

$$QP_i(1) = Q_{step} \text{ to } QP(Q_{step,i}(1)) - \min\left\{1, \frac{N_{i-1}}{15}\right\}, \quad (16)$$

where $Q_{step,i}(1)$ is the quantization step size of the first I frame in the i-th GOP, $SumPQ_{step}(i-1)$ is the sum of the quantization step sizes of all P frames in the previous GOP, and $Q_{step}$toQP (.) is the function of converting a quantization step size to a quantization parameter. From Equation (16), the maximum adjustment value is 1 to prevent I frame from overusing the allocated bits. Moreover, a smaller adjustment value can more easily maintain the uniformity of image quality.

It should be noted that the quantization step sizes, instead of quantization parameters are used to determine the quantization parameter.

Secondly, the quantization parameter of a P frame is calculated. The P frame quantization parameter has to simultaneously refer to three different quantization parameters: $Q_{distortion}$, $Q_{CBR}$ and $Q_{constant}$ as follows:

$$Q_{current} = \min(Q_{distortion}, Q_{constant}, Q_{CBR}) \quad (17)$$

where $Q_{CBR}$ is a quantization parameter computed according to a constant bit rate (CBR) rate control algorithm, $Q_{distortion}$ is a distortion-based quantization parameter computed by a quadratic model with the target bits allocated according to the distortion of the base sequence and the ROI sequence. The calculation of $Q_{constant}$ is as follows:

$$Q_{constant} = Q_{step} \text{ to } QP\left(\frac{X_{avg}^P}{T_{rem}^P/N_{rem}^P}\right). \quad (18)$$

where $X^P_{avg}$ is the average complexity that is calculated by using the quantization step size, and $T^P_{rem}$ and $N^P_{rem}$ have been calculated out in Steps S14 and S16.

These three quantization parameters have different purposes. $Q_{distortion}$ is calculated for the purpose of ensuring the current frame has the same quality as the average quality of previous frames. $Q_{constant}$ produces an almost constant quantization parameter to eliminate quality fluctuation. $Q_{CBR}$ is chosen instead of other values so that the output quality level can match the changing of the scene activity. When the scene changes from a high activity scene to a low activity scene, the quantization parameter selection mechanism will automatically choose $Q_{CBR}$ to replace other values in order to make the output quality level and the variation of scene activity more compatible.

Figure 5:
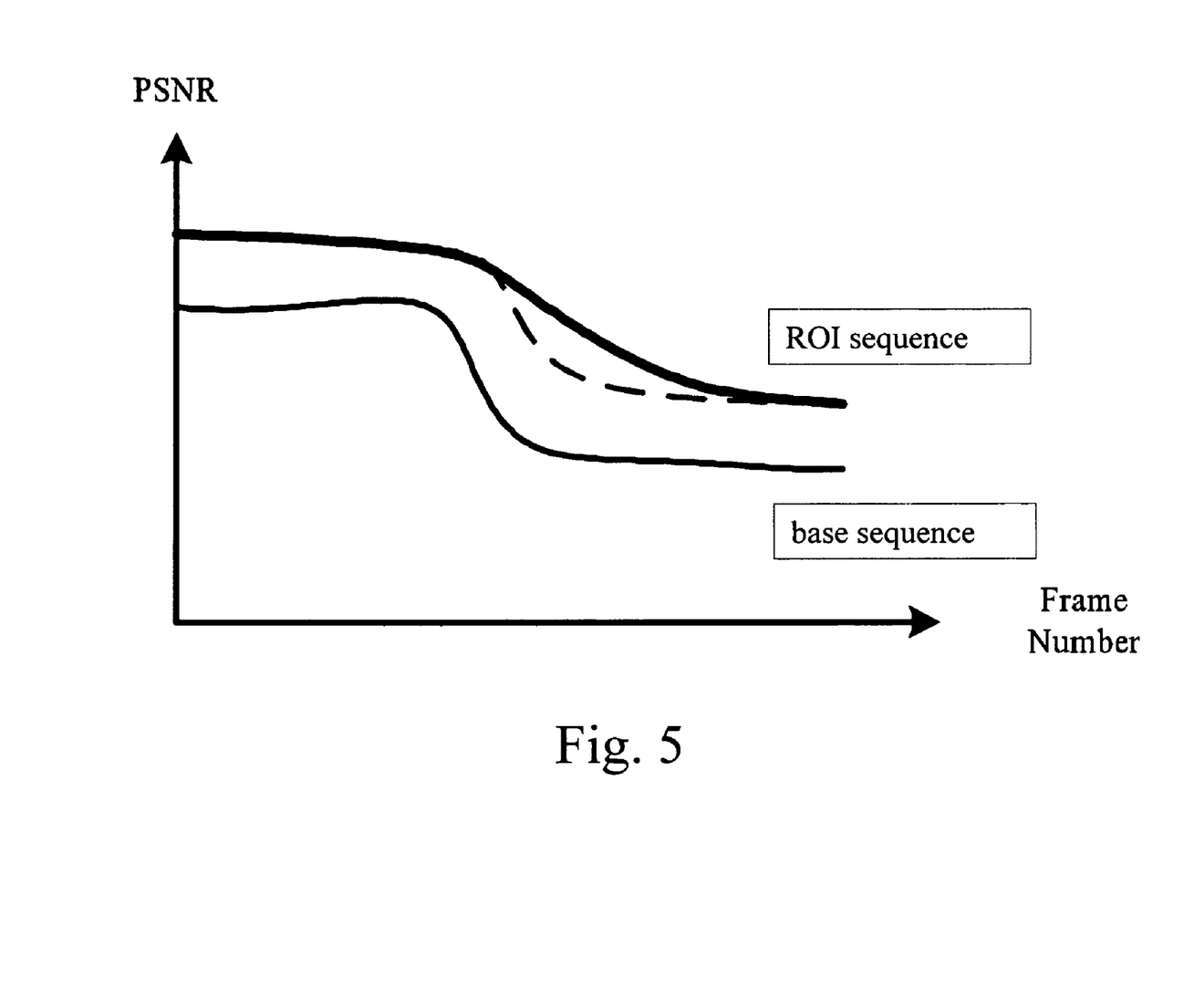
FIG. 5 is a graph of peak signal-to-noise ratio (PSNR) versus frames per second (fps) for an ROI sequence and a base sequence transitioning from a low-activity scene to a high-activity scene.

FIG. 5 is a graph of PSNR versus frames per second (fps) for an ROI sequence and a base sequence from a low-activity scene (high PSNR) to a high-activity scene (low PSNR). The dashed line in FIG. 5 represents an ROI sequence encoded using a CBR rate control algorithm. Because of the fixed channel bandwidth limit, the image quality will drop abruptly. The quantization parameter $Q_{constant}$ can be used to solve this problem of abrupt drop of image quality in order to make the variation of PSNR more gradual, as the thick line in FIG. 5 shows. Therefore, the above algorithm can be used to select the quantization parameter, which is then used to achieve the objective of rate-distortion optimized motion estimation.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A constant-quality rate control system comprising:
    a base encoder for encoding a down-sampled version of a video sequence into a base video sequence and outputting the base video sequence to a multiplexer;
    a region of interest (ROI) detector for extracting an ROI video sequence from the video sequence;
    at least one ROI encoder for encoding the ROI video sequence and outputting the ROI video sequence to the multiplexer, the at least one ROI encoder using information obtained during the process of encoding the down-sampled version of the video sequence into the base video sequence to improve the encoding of the ROI video sequence.

2. The constant-quality rate control system of claim 1, where the information is used to estimate how many bits are needed for a frame in the ROI video sequence to achieve constant quality.

3. The constant-quality rate control system of claim 1, the information comprising data related to a region in the base video sequence corresponding to a current frame in the ROI video sequence.

4. The constant-quality rate control system of claim 1, where the ROI video sequence is encoded at a resolution equal to the video sequence.

5. A constant-quality rate control method for a region of interest sequence in a video sequence comprising:
    determining an initial quantization parameter and extracting the region of interest sequence from the video sequence according to the initial quantization parameter;
    predicting a mean absolute difference of a current frame of the region of interest sequence;
    estimating how many bits are remaining in the current frame;
    allocating bits for the current frame; and
    determining I frame and P frame quantization parameters;
    where the mean absolute difference of the current frame is predicted by data from a corresponding region in a down-sampled version of the video sequence.

6. The constant-quality rate control method of claim 5, where the initial quantization parameter is selected according to an encoding setting.

7. The constant-quality rate control method of claim 5, where the remaining bits are allocated according to a corresponding complexity measure.

8. The constant-quality rate control method of claim 5, where the remaining bits are allocated by defining a frame complexity measure according to distortion of a corresponding region in a down-sampled version of the video sequence.

9. A constant-quality rate control method for a video sequence comprising:
- using a region of interest detector to extract a region of interest sequence from the video sequence;
- using a region of interest encoder to predict a mean absolute difference (MAD) of a current frame in the region of interest sequence based on a MAD of a corresponding frame in a down-sampled version of the video sequence;
- estimating a number of remaining bits of the current frame according to complexity of the current frame;
- calculating a current complexity of the current frame and calculating a target bit number required by the current frame based on an average number of the remaining bits and the current complexity in order to make quality of the current frame similar to that of an immediately previous frame; and
- defining an I frame quantization parameter and a P frame quantization parameter based on the current complexity and the target bit number in order to make bit rate of the video sequence constant.

10. The constant-quality rate control method for a video sequence of claim 9, where an initial quantization parameter is selected according to an encoding setting.

11. The constant-quality rate control method for a video sequence of claim 9, where the MAD is predicted for each frame of the region of interest sequence.

12. The constant-quality rate control method for a video sequence of claim 9, where the MAD is used to calculate a rate-distortion optimization (RDO) of the region of interest sequence.

13. The constant-quality rate control method for a video sequence of claim 9, where information such as MAD and distortion obtained by encoding is sent to the region of interest encoder after the video sequence is encoded by a base encoder.

14. The constant-quality rate control method for a video sequence of claim 9, where the target bit number is a number of bits allocated to the current frame in the region of interest sequence.

15. The constant-quality rate control method for a video sequence of claim 9, where complexity of the current frame of the region of interest sequence is calculated based on distortion of a corresponding frame in a down-sampled version of the video sequence.

16. The constant-quality rate control method for a video sequence of claim 9, where quantization step sizes are used to determine the I frame and P frame quantization parameters.

17. The constant-quality rate control method for a video sequence of claim 9, where the P frame quantization parameter is least among a distortion parameter, a constant bit-rate quantization parameter, and a constant parameter.

18. The constant-quality rate control method for a video sequence of claim 17, wherein the distortion parameter is determined according to a previous frame quality and distortion of a base sequence.

19. The constant-quality rate control method for a video sequence of claim 17, where the constant bit-rate quantization parameter is calculated using a CBR rate control algorithm.

20. A constant-quality rate control method comprising:
- down-sampling a video frame to a lower resolution;
- encoding the down-sampled frame to a base frame;
- extracting a region of interest frame from the video frame; and
- encoding the region of interest frame using information obtained during the process of encoding the down-sampled frame to the base frame.

* * * * *